3,740,430
METHOD FOR INHIBITING DOPAMINE-β-HYDROXYLASE USING PIPERAZINE DERIVATIVES OF DITHIOCARBOXYLATES, AND PHARMACEUTICAL PREPARATIONS THEREOF
Per Arvid Emil Carlsson, Goteborg, Hans Rudolf Corrodi, Molndal, and Gosta Lennart Florwall and Svante Bertil Ross, Sodertalje, Sweden, assignors to Aktiebolag Astra, Sodertalje, Sweden
No Drawing. Original application Dec. 11, 1968, Ser. No. 783,131, now Patent No. 3,644,623. Divided and this application Dec. 16, 1970, Ser. No. 98,948
Int. Cl. A61k 27/00
U.S. Cl. 424—250
14 Claims

ABSTRACT OF THE DISCLOSURE

Piperazine derivatives of dithiocarboxylates having the general formula

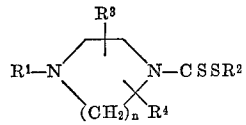

a process for their preparation, and a method for the inhibition of the enzyme dopamine-β-hydroxylase wherein a therapeutically effective dose of a pharmaceutically acceptable preparation of a compound of the said general formula is administered orally, rectally or by means of an injection to produce a sedative effect.

---

This is a divisional application of Ser. No. 783,131 filed Dec. 11, 1968 now U.S. Pat. No. 3,644,623.

The present invention relates to a method to inhibit the enzyme dopamine-β-hydroxylase, compounds having such an effect, a method for the manufacture of such compounds and pharmaceutical preparations containing them.

The object of the present invention is to provide a compound by means of which there takes place an inhibition of the hydroxylation of dopamine [β-(3,4-dihydroxyphenyl) ethylamine] to noradrenaline [1-α-(aminomethyl)-3,4-dihydroxybenzyl alcohol] and there is obtained a psychotherapeutic effect.

It has previously been known that tetraethylthiuram disulfide and its metabolite diethyldithiocarbamate, and the structurally similar compound phenylethyl dithiocarbamate, are dopamine-β-hydroxylase inhibitors. It has now been found possible according to the present invention to obtain a considerably higher enzyme inhibiting activity than by means of previously known compounds by administering to living beings an effective dosage of a compound of the general formula

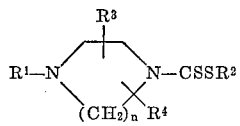

wherein $n$ denotes the number 2, $R^1$ denotes a straight or branched, alkenyl or alkyl group having at most 6 carbon atoms, $R^3$ and $R^4$ are selected from the group consisting of hydrogen and methyl and $R^2$ denotes hydrogen, sodium, or another non-toxic cation.

The present invention relates in particular to new compounds which are characterized by the general formula

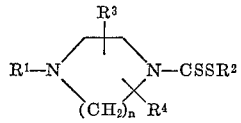

wherein $n$ denotes the number 2, $R^1$ denotes a straight or branched alkenyl or alkyl group having at most 6 carbon atoms, $R^3$ and $R^4$ are chosen from the group consisting of hydrogen and methyl and $R^2$ denotes hydrogen, sodium, or another non-toxic cation, and when (1) $n$ is 2, (2) $R^2$ is sodium and (3) $R^1$ is methyl, ethyl, n-propyl, n-butyl, amyl or isopropyl: at least one of $R^3$ and $R^4$ must be methyl. The same conditions, that is, that at least one of $R^3$ and $R^4$ must be methyl, also obtain when (1) $n$ is 2, (2) $R^2$ is hydrogen and (3) $R^1$ is methyl or ethyl.

The expression alkyl means in this connection primary, secondary and tertiary alkyl groups having straight as well as branched chains, the number of carbon atoms being as indicated, at most six. The alkyl group is preferably a methyl, ethyl, n-propyl, amyl, isopropyl or secondary butyl group, or the like.

Certain groups of these new compounds have been found to be particularly effective for inhibiting the hydroxylation of dopamine to noradrenaline. One such group are those compounds of the general formula

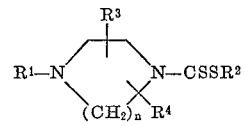

wherein $n$ is 2, $R^1$ is methyl, ethyl, n-propyl, isopropyl, butyl or allyl, both $R^3$ and $R^4$ are hydrogen and $R^2$ is hydrogen, sodium.

Another such group of new compounds of the general formula occurs when $n$ is 2, $R^1$ is methyl, ethyl, isopropyl, sec-butyl, amyl or allyl, $R^2$ is hydrogen or sodium, $R^3$ is 2- or 3-methyl and $R^4$ is hydrogen. Also included is the group of compounds wherein $n$ is 2, $R^1$ is methyl or isopropyl, $R^2$ is once again hydrogen or sodium, $R^3$ is 2- or 3-methyl and $R^4$ is 5- or 6-methyl.

These new compounds including those preferred are manufactured as follows: A compound of the general formula

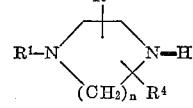

is reacted with carbon disulfide, alone or in the presence of a compound of the formula $R^0Z$, wherein $R^0$ denotes sodium, or another non-toxic cation, and Z denotes an anion, such as, e.g., $OH^-$, $CO_3^{2-}$ and the like, for the formation of a compound of the general formula

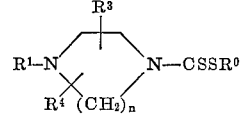

which thereupon, if compounds are desired where $R^2$ denotes hydrogen, is reacted with an acid.

In clinical practice the compounds of the invention will normally be administered orally, rectally or by means of an injection in the form of a pharmaceutical preparation comprising a therapeutically active dose containing at least one of the aformentioned compounds incorporated in a pharmaceutically acceptable carrier, which may comprise a solid, a semi-solid, a liquid or a capsule. These preparations normally contain between 0.1 and 95 percent by weight for preparations intended for injections and between 2 and 50 percent by weight for preparations intended for oral administration.

To produce a pharmaceutical preparation containing a compound of the present invention, in the form of dosage units for oral administration, such a compound may be mixed with a solid pulverulent carrier, for example, lactose, saccharose, sorbitol, mannitol, starch, such as potato starch, cornstarch, amylopectin, laminaria powder or a citrus pulp powder, cellulose derivatives or gelatin. The compound may also include a lubricant such as magnesium or calcium stearate or a Carbowax or other polyethylene glycol wax, the final mixture being compressed to form tablets. When coated tablets are required, the cores may be coated with a concentrated sugar solution which may contain, for example, gum arabic, talcum and/or titanium dioxide. Alternatively, the tablets may be coated with a lacquer dissolved in a volatile organic solvent or a mixture of organic solvents. Dyestuffs may be added to these coatings, for distinction between tablets containing different contents of the active compound. For the preparation of soft gelatine capsules (pearl-shaped, closed capsules) consisting of gelatin and, for example, glycerol and similar closed capsules, the active substance may be admixed with a vegetable oil. Hard gelatin capsules may contain granulates of the active substance in combination with solid pulverulent carriers such as lactose, saccharose, mannitol, starches (e.g., potato starch, cornstarch or amylopectin), cellulose derivatives or gelatin. Dosage units for rectal administration may comprise suppositories comprising the active compound in admixture with a neutral fatty base or gelatin capsules comprising the active compound in admixture with vegetable oil or paraffin oil.

Liquid preparations for oral administration may be in the form of syrups or suspensions, for example, solutions containing from about 2 to about 20 percent by weight of the active compound, sugar and a mixture of ethanol, water and glycerol, propeneglycol and, in addition, flavoring agents, saccharine and/or carboxymethyl cellulose as a thickening agent.

For parenteral administration by means of injections, the preparations according to the invention preferably comprise an aqueous solution of the active compound in a concentration of 0.5 to 10 percent by weight, and further, a stabilizing agent and/or a buffering agent. For convenience, it might be desirous to enclose the dosage units of the solution in ampoules.

The dosage amount for one patient depends upon the active compounds used, the manner of administration and the desired therapeutic effect. Generally, the dose varies from 0.5 mg. to about 7 mg. per kilo of the body weight at a peroral one-shot dose.

Compounds of the general formula

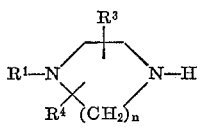

where $n$, $R^1$, $R^3$ and $R^4$ have the significance as indicated above, may be manufactured in various ways. In cases when $R^3$ and $R^4$ are hydrogen or a methyl in the 2- and/or 6- or 7-position respectively in relation to $R^1$, the following reaction scheme could preferably be followed:

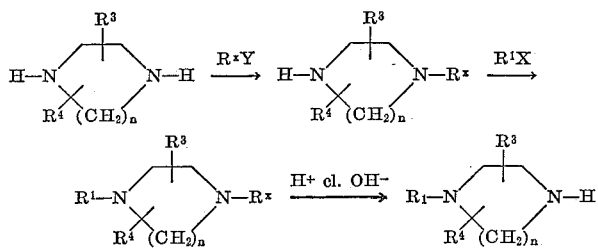

wherein $R^x$ denotes a protecting group, such as, for example, an alkoxycarbonyl, benzyl, trityl, acyl, nitroso or sulphonyl group (cf. Examples 1, 2, 7, 8 and 9 infra).

When $R^3$ and $R^4$ denote hydrogen, it is advisable to start with the hemisalt of the above diamine to give the following reaction:

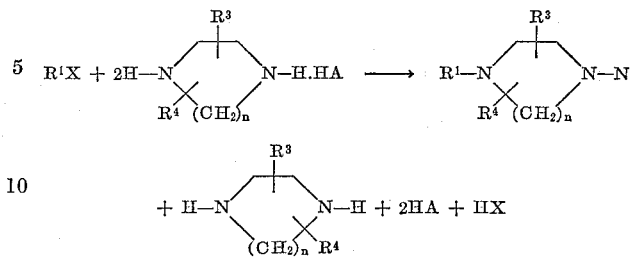

wherein HA could denote an inorganic as well as an organic acid.

When at least one of $R^3$ and $R^4$ denotes a methyl group in 3- or 5-position in relation to $R^1$, the reaction preferably follows the following reaction scheme:

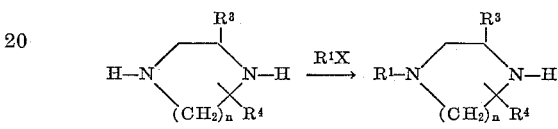

(cf. the Examples 3, 4, 5 and 6 in the following).

During the reaction between the amine

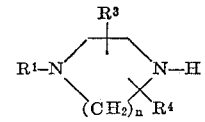

and carbon disulfide in an inert solvent, such as, for example, ether, the free acid is obtained

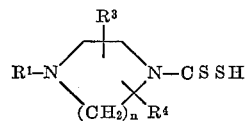

present as an internal salt

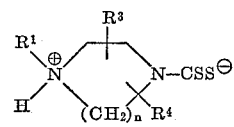

which then, if a compound is desired in which $R^2$ denotes sodium, or another non-toxic cation other than hydrogen, may be reacted with the hydroxide of the desired cation in an equivalent quantity, and the corresponding salt will be formed.

For a direct formation of the compound

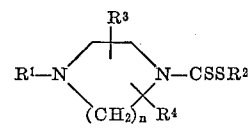

wherein $R^2$ denotes sodium or another non-toxic cation, the amine

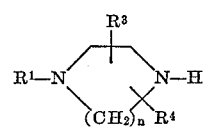

is reacted with carbon disulfide in the presence of the hydroxide of the desired cation. If the free acid is desired, the salt formed may then be reacted with an acid, such as acetic acid, and the free acid will precipitate as an internal salt.

The present invention will now be described with reference to the following examples without being in any way restricted thereto. Therefore, though the examples disclose the preparation of compounds wherein $R^1$ is an alkyl or alkylene group, it is intended to include the processes, compounds and compositions where R¹ is alkyne as well.

EXAMPLE 1

85 g. (0.05 mol) of 2-methylpiperazine were dissolved in 700 ml. of water to which solution was added a small quantity of benzylorange as an indicator. The solution was acidified with concentrated hydrochloric acid to a clear color change to orange, and then the excess acid was neutralized with a saturated sodium acetate solution until a color change to yellow. 78 ml. (1 mol) of chloro-formic acid methyl ester was then added drop by drop, with a careful stirring, the pH-value being adjusted by means of a saturated sodium acetate solution. The solution thus obtained was extracted by means of ether and the water phase was saturated in coolness with potassium carbonate and then the base was extracted by means of ether, which was dried over anhydrous sodium sulfate. The ether was evaporated and the residue was distilled. 95.5 g. of 1-carbomethoxy-3-methylpiperazine was obtained at 105–107° C./10 mm. Hg. The equivalent weight was calculated to be 158 while determined by analysis to be 160.

30.4 g. (0.192 mol) of the product obtained were refluxed with stirring for 17 hours with 15.6 ml. (0.195 mol) of ethyl iodide and 27.6 g. (0.2 mol) of potassium carbonate in 350 ml. of absolute alcohol. The potassium iodide formed and the remaining quantity of potassium carbonate was filtered off and washed with absolute ethanol. The filtrate was evaporated in a vacuum and the residue dissolved in ether. The remaining quantity of salts was sucked off and the ether was evaporated. The residue was distilled, and 30 g. of 4-ethyl-1-carbomethoxy-2-methylpiperazine were obtained at 110–111° C./10 mm. Hg.

30 g. of the product were refluxed in 150 ml. of concentrated hydrochloric acid for three days and then the excess hydrochloric acid was boiled off. To the residue, 4-ethyl-3-methylpiperazine hydrochloride, there was added 150 ml. of a 30% solution of sodium hydroxide, the solution then being saturated with solid sodium hydroxide. The amine phase was dissolved in ether and dried over anhydrous sodium sulfate. The ether was evaporated, and 15.3 g. of raw 1-ethyl-2-methylpiperazine were obtained.

To an iced solution of 10 ml. of carbon disulfide in 150 ml. of ether, 15.3 g. of raw 1-ethyl-2-methylpiperazine in 100 ml. of ether were added drop by drop while stirring. The mixture was stirred for 30 minutes and a precipitate formed, raw 4-ethyl-3-methyl-1-piperazinedithiocarboxylic acid, which was filtered off and washed with ether. The melting point was 165–167° C. (subl.). The yield was 18.1 g. The product was recrystallized from water and had a 175–176° C. melting point (subl.). The yield was 4.3 grams.

*Analysis.*—Calculated (percent): C, 47.02; H, 7.89; N, 13.71; S, 31.38. Found (percent): C, 46.7; H, 7.84; N, 13.8; S, 31.4.

EXAMPLE 2

34.4 g. (0.2 mol) of 1-carbethoxy-3-methylpiperazine, which was obtained analogously to the 1-carbomethoxy-3-methylpiperazine according to Example 1, 17.3 ml. (0.2 mol) of allyl bromide, 28 g. (0.2 mol) of potassium carbonate and 5 g. of potassium iodide in 300 ml. of ethanol were refluxed while stirring for 24 hours. The salts were filtered off and washed with ethanol and the filtrate was evaporated in a vacuum. The residue was dissolved in ether and the remaining salts were sucked off. The ether was then evaporated and the residues distilled. 30.8 g. of 4-allyl-1-carbethoxy-3-methylpiperazine were obtained at 132–134° C./10 mm. Hg. The equivalent weight was calculated to be 212.3 while by an analysis found to be 214.

30.8 g. of the product were refluxed in 150 ml. of concentrated hydrochloric acid for three days. The hydrochloric acid was evaporated in a vacuum, and to the residue 150 ml. of a 30% solution of sodium hydroxide was added and the solution saturated with solid sodium hydroxide. The amine phase was dissolved in ether and dried over anhydrous sodium sulfate whereupon the ether was evaporated and the residue distilled. 14.5 g. of 1-allyl-2-methylpiperazine was obtained at 78–80° C./15 mm. Hg. An analysis gave the equivalent weight of 74 in relation to the calculated weight of 70.12.

14.5 g. (0.104 mole) of the product was dissolved in 52 ml. of 2 N sodium hydroxide with subsequent addition of 6.3 ml. (0.104 mol) of carbon disulfide. The mixture was evaporated in a vacuum after stirring at room temperature for 30 minutes and the residue was recrystallized from ethanol ether. 15.9 g. of sodium-4-allyl-4-methyl-1-piperazinedithiocarboxylate dihydrate with a melting point of 91–94° C. was obtained.

*Analysis.*—Calculated (percent): C, 39.4; H, 6.98; N, 10.21; S, 23.37. Found (percent): C, 38.8; H, 7.00; N, 10.3; S, 23.4.

EXAMPLE 3

50 g. (0.5 mol) of 2-methylpiperazine, 100 ml. (1.06 mol) of isopropyl bromide, 70 g. (0.5 mol) of potassium carbonate, 20 g. of potassium iodide in 350 ml. of absolute ethanol were refluxed while stirring until the formation of carbon dioxide ceased, which takes place within two days. The salts were filtered off and washed with ethanol. The filtrate was evaporated in a vacuum, the residue dissolved in ether and the remaining salts filtered off. The ether was evaporated and the residue distilled. 30.8 g. of 1-isopropyl-3-methylpiperazine were obtained at 66–69° C./10 mm. Hg. The equivalent weight was calculated to be 71.13 and was determined by an analysis to be 72.

30.8 g. of the product were reacted under intense stirring with 14 ml. of carbon disulfide in 110 ml. of 2 N sodium hydroxide. Water was added to the solution to a total volume of 800 ml. with subsequent adjustment of the hydrogen ion concentration to a pH-value of 6 by means of an addition, drop by drop, of acetic acid during intense stirring and ice cooling. After 30 minutes the precipitate formed was sucked off, it being 4-isopropyl-2-methyl-1-piperazinedithiocarboxylic acid which was washed with water, ethanol and ether. The melting point was determined to be 125–128° C. The yield was 20.6 g.

The product was dissolved in 800 ml. of dilute sodium hydroxide and reprecipitated by means of acetic acid. The melting point was 128–130° C. The yield was 8.5 g.

*Analysis.*—Calculated (percent): C, 49.50; H, 8.31; N, 12.83; S, 29.36. Found (percent): C, 48.6; H, 8.49; N, 13.0; S, 29.7.

EXAMPLE 4

A mixture of 50 g. (0.5 mol) of 2-methylpiperazine, 60 ml. of 2-bromobutane, 70 g. (0.5 mol) of potassium carbonate, 5 g. of potassium iodide, and 350 ml. of methyl ethyl ketone was refluxed during stirring for 12 hours. The potassium bromide formed and the remaining quantities of potassium carbonate and potassium iodide were filtered off and washed by means of ethanol. The filtrate was then evaporated in a vacuum and the residue dissolved in ether. The remaining quantity of salts was sucked off, the ether evaporated and the residue distilled. 24.5 g. of 1-sec-butyl-3-methylpiperazine were obtained at 77–79° C./10 mm. Hg. The equivalent weight was calculated to be 78.14 while found by analysis to be 81.

24.5 g. of the product reacted with 10 ml. of carbon disulfide in the presence of 85 ml. of 2 N sodium hydroxide. Water was added to the solution to a total volume of 300 ml. and the solution acidified by addition of acetic acid to a pH-value of 6. The precipitate which comprised 4-sec-butyl-2-methyl-piperazinedithiocarboxylic acid, was sucked off and washed with ice water and ether. The melting point was 82–85° C. The yield was 26.5 g.

After a reprecipitation with acetic acid from 400 ml. of sodium hydroxide, 11.9 g. with a melting point 85–87° C. were obtained.

*Analysis.*—Calculated (percent): C, 51.68; H, 8.67; N, 12.06; S, 27.59. Found (percent): C, 51.5; H, 8.64; N, 12.1; S, 27.1.

EXAMPLE 5

19.7 g. of 1 - allyl - 3 - methylpiperazine, which was obtained analogously to 1 - sec-butyl-3-methylpiperazine according to Example 4 and distilled at 71–75° C./10 mm. Hg, was reacted with 8.5 ml. of carbon disulfide in the presence of 69 ml. of 2 N sodium hydroxide. The solution was diluted to a volume of 500 ml. by an addition of water and the internal salt was precipitated by means of acetic acid at pH-value 7 and then sucked off. The product, 4 - allyl - 2 - methyl - 1 - piperazinedithiocarboxylic acid, melted at 85–87° C. and had a weight of 15.5 g. 4 - allyl - 2 - methyl-1-piperazinedithiocarboxylic acid was reprecipitated from 700 ml. of diluted sodium hydroxide by means of acetic acid. The melting point was 88–89° C. The yield was 2.2 g.

*Analysis.*—Calculated (percent): C, 49.96; H, 7.45; N, 12.95; S, 29.64. Found (percent): C, 50.3; H, 7.24; N, 12.9; S, 29.8.

EXAMPLE 6

17.0 g. of 1 - isopropyl - 3,5 - dimethylpiperazine with a calculated equivalent weight of 78.14, an analysis weight of 81, a boiling point of 65–66° C./10 mm. Hg and prepared as 1-isopropyl-3-methylpiperazine according to Example 3, was reacted with 6.6 ml. of carbon disulfide in 54.5 ml. of 2 N sodium hydroxide. The mixture was evaporated in a vacuum and the residue recrystallized from ligroin-ethanol. The melting point was 135–138° C. The yield was 17.5 g.

The product was dissolved in ethanol and petroleum ether was added in an amount giving a slight precipitation. The mixture was left at 0° C. overnight and a precipitate formed which was filtered off (about 0.5 g. of contaminations with a melting point of 250° C.). The product, sodium 4 - isopropyl - 2,6 - dimethyl-1-piperazinedithiocarboxylate, with 1.5 crystal water was then precipitated by means of ether from the mother liquor. The melting point was 136–138° C. The yield was 2.1 g.

*Analysis.*—Calculated (percent): C, 42.68; H, 7.88; N, 9.99; S, 22.79. Found (percent): C, 42.8; H, 7.87; N, 10.1; S, 22.9.

EXAMPLE 7

62.5 g. (0.362 mol) of 1 - carbethoxy - 3 - methylpiperazine, 68 ml. (0.4 mol) of isopropyl bromide, 51 g. of potassium carbonate and 10 g. of potassium iodide in 300 ml. of methyl-ethyl ketone was refluxed with stirring for 4 days. The salt was filtered off and washed with ethanol, and the filtrate was evaporated in a vacuum. The remaining salt was precipitated with ether. The ether was evaporated and the residue distilled. 52.3 g. of 4-isopropyl - 1 - carbethoxy - 3 - methylpiperazine were obtained at 131–133° C./10 mm. Hg. The equivalent weight was found to be 218, while calculated to be 214.3.

52.3 g. of the product were refluxed with 250 ml. of concentrated hydrochloric acid for three days and the solution was evaporated in a vacuum. 150 ml. of 30% sodium hydroxide was added to the residue. The amine phase was dissolved in ether and dried over sodium sulfate. The ether was evaporated and the residue distilled. 24.6 g. of 1 - isopropyl - 2 - methylpiperazine were obtained at 70–71° C./10 mm. Hg.

24.6 g. of the product were reacted with 11 ml. of carbon disulfide in the presence of 87 ml. of 2 N sodium hydroxide. The solution was evaporated in a vacuum and the product, sodium-4-isopropyl-3-methyl-1-piperazine-dithiocarboxylate dihydrate, was recrystallized from ethanol-isopropyl ether. The melting point was 133–135° C. The yield was 10.5 g.

*Analysis* (raw product).—Calculated (percent): C, 39.11; H, 7.66; N, 10.13; S, 23.20. Found (percent): C, 41.6; H, 7.85; N, 10.5; S, 23.6.

EXAMPLE 8

82.4 g. of 4 - amyl - 1 - carbethoxy-3-methylpiperazine having a boiling point of 117–120° C./15 mm. Hg, which were obtained analogously to 4 - allyl - 1 - carbethoxy-3-methyl-piperazine according to Example 2, were refluxed in 380 ml. of concentrated hydrochloric acid for three days and the solution was subsequently evaporated in a vacuum. 300 ml. of 30% sodium hydroxide solution were added and the amine phase formed was dissolved in ether and dried over anhydrous sodium sulfate. The ether was evaporated and the residue distilled. 42.4 g. of 1-amyl-2-methylpiperazine were obtained at 99–100° C./10 mm. Hg.

42.4 g. of the product were reacted with 15 ml. of carbon disulfide in 124 ml. of 2 N sodium hydroxide. The solution was evaporated in a vacuum and the residue was recrystallized twice from ethyl acetate. The product, sodium - 4-amyl-3-methyl-1-piperazinedithiocarboxylate, was dissolved in 500 ml. of water. 4-amyl-3-methyl-1-piperazinedithiocarboxylic acid was precipitated by means of acetic acid at pH-value 7. The melting point was 112–114° C. The yield was 15.5 g.

*Analysis.*—Calculated (percent): C, 53.61; H, 9.00; N, 11.37; S, 26.02. Found (percent): C, 53.5; H, 9.05; N, 11.3; S, 25.9.

EXAMPLE 9

57 g. (0.5 mol) of 2,6-dimethyl piperazine, and a small amount of benzylorange indicator, were dissolved in 150 ml. of water. Concentrated hydrochloric acid was added in such an amount that there was obtained a color change to orange. Excess hydrochloric acid was neutralized with sodium acetate. Chloro-formic acid ethyl ester was then added, drop by drop while stirring, in an amount of 53 ml. (0.55 mol) with the addition of sodium acetate to adjust pH-value. The solution obtained was acidified with concentrated hydrochloric acid and extracted with ether. The water phase was neutralized with 30% sodium hydroxide and saturated with potassium carbonate. The amine phase formed was dissolved in ether and the water phase was ether extracted. The collected ether phase was then dried over anhydrous sodium sulfate and distilled. 58.0 g. of 1-carbethoxy-3,5-dimethylpiperazine were obtained at 85–87° C./1 mm. Hg.

58.0 g. (0.31 mole) of the product were added to a mixture of 30 ml. of 100% formic acid, 28 ml. 35% formaldehyde and 4 ml. of water while stirring and cooling by means of ice. The solution was left for 15 hours at 130° C. and then acidified with concentrated hydrochloric acid and evaporated in a vacuum.

The residue, 1-carbethoxy-3,4,5-trimethylpiperazine hydrochloride, was refluxed in 200 ml. of concentrated hydrochloric acid for three days with subsequent evaporation of the solution in a vacuum. 250 ml. of 30% sodium hydroxide were then added and the amine phase formed was dissolved in ether, dried over anhydrous sodium sulfate and distilled. 20.3 g. of 1,2,6 - trimethylpiperazine were obtained at 174–176° C./760 mm. Hg.

20.3 g. (0.158 mol) of the product were reacted with 10 ml. of carbon disulfide in 80 ml. of 2 N sodium hydroxide. The solution was evaporated in vacuum and the residue was recrystallized twice from ethanol-ether. The final product, sodium-3,4,5-trimethyl-1-piperazinedithiocarboxylate, melted at 166–169° C. and had a weight of 12.6 g.

*Analysis.*—Calculated (percent): C, 42.45; H, 6.68; N, 12.38; S, 28.33. Found (percent): C, 42.3; H, 6.99; S, 27.9.

Products manufactured in a way analogous to the previous examples are reported below in Table 1. The melting point and calculated and found amounts of carbon, hydrogen, nitrogen and sulfur in percent by weight are indicated.

TABLE 1

| n | R¹ | R² | R³ | R⁴ | Melting point, °C. | Calculated CF | HF | NF | SF | Found CF | HF | NF | SF |
|---|---|---|---|---|---|---|---|---|---|---|---|---|---|
| 2 | CH₂=CH—CH— | H | H | H | ¹175 | 47.49 | 6.97 | 13.84 | 31.69 | 47.0 | 7.05 | 13.8 | 31.7 |
| 2 | CH₃— | H | 3—CH₃— | H | ¹170 | 44.17 | 7.41 | 14.72 | 33.69 | 44.0 | 7.35 | 14.8 | 33.5 |
| 2 | CH₃— | H | 2—CH₃— | 5—CH₃— | 160–162 | 47.02 | 7.89 | 13.71 | 31.38 | 46.7 | 7.61 | 14.0 | 31.3 |

¹ Subl.

The compounds according to the present invention have valuable therapeutic qualities due to their inhibition of the enzyme dopamine-β-hydroxylase whereby the hydroxylation of dopamine to noradrenaline is inhibited and a sedative effect is obtained.

Table 2 shows the biological activity of compounds according to the present invention in certain behavioral experiments performed on mice. The compounds were injected intraperitoneously into the mice in groups of six and the contents of noradrenaline in the brain were determined 2, 4, and 8 hours after the injection. The determinations then were carried out according to Bertler et al., Acta Physiol. Scand. 44, 273 (1958). The values indicated in Table 2 give the contents of noradrenaline in the brain in percent of the normal contents of noradrenaline, which was found to be 0.45±0.009 mg./g. upon the basis of 10 tests. A drop of the contents of noradrenaline at normal or slightly increased dopamine contents in the brain is then an indication of inhibition of dopamine-β-hydroxylase. In all the doses reported in Table 2, the dopamine values of the brain were normal.

TABLE 3

| n | R¹ | R² | R³ | R⁴ | LD₅₀, mg./kg. |
|---|---|---|---|---|---|
| 2 | CH₃— | H | H | H | 250 |
| 2 | CH₂=CH—CH₂— | H | H | H | >500 |
| 2 | C₂H₅— | H | H | H | 400 |
| 2 | CH₃— | H | 3—CH₃— | H | 500 |
| 2 | C₂H₅— | H | 3—CH₃— | H | >500 |
| 2 | CH₃—(CH₂)₂— | Na | H | H | 500 |
| 2 | (CH₃)₂CH— | Na | H | H | >500 |
| 2 | CH₃—(CH₂)₃— | Na | H | H | 250 |
| 2 | CH₃— | Na | 3—CH₃— | 5—CH₃— | >500 |
| 2 | CH₃— | H | 2—CH₃— | 5—CH₃— | 500 |
| 2 | CH₃(CH₂)₄— | H | 3—CH₃— | H | 200 |
| 2 | CH₂=CH—CH₂— | Na | 3—CH₃— | H | >500 |
| 2 | (CH₃)₂CH— | H | 2—CH₃— | H | >500 |
| 2 | (CH₃)₂CH—C₂H₅ (sec-butyl) | H | 2—CH₃ | H | 450 |
| 2 | CH₂=CH—CH₂— | H | 2—CH₃— | H | >500 |
| 2 | (CH₃)₂CH— | Na | 2—CH₃— | 6—CH₃— | >500 |
| 2 | (CH₃)₂CH— | Na | 3—CH₃— | H | >500 |

TABLE 2

| n | R¹ | R² | R³ | R⁴ | Dose, mg./kg. | 2 hours | 4 hours | 8 hours |
|---|---|---|---|---|---|---|---|---|
| 2 | CH₃— | H | H | H | 75 | 37.4±5.6 | 62.9±3.3 | 72.0±3.7 |
| 2 | CH₂=CH—CH₂— | H | H | H | 75 | 56.6 | 69.0 | 83.2 |
| 2 | C₂H₅— | H | H | H | 75 | 42.7±4.3 | 57.2±6.8 | 79.0±3.4 |
| 2 | CH₃— | H | 3—CH₃— | H | 75 | 49.7 | 68.2 | 89.9 |
| 2 | C₂H₅— | H | 3—CH₃— | H | 75 | 59.7 | 84.6 | 80.2 |
| 2 | CH₃—(CH₂)₂— | Na | H | H | 75 | 55.1 | 77.9 | 94.2 |
| 2 | (CH₃)₂CH— | Na | H | H | 75 | 61.9 | 53.2 | 68.3 |
| 2 | CH₃—(CH₂)₃— | Na | H | H | 75 | 58.9 | 68.4 | 95.1 |
| 2 | CH₃— | Na | 3—CH₃— | 5—CH₃— | 75 | 68.0 | 87.4 | 109.3 |
| 2 | CH₃— | H | 2—CH₃— | 5—CH₃— | 75 | 58.2 | 55.5 | 99.6 |
| 2 | CH₃—(CH₂)₄— | H | 3—CH₃— | H | 75 | 59.4 | 75.2 | 87.7 |
| 2 | CH₂=CH—CH— | Na | 3—CH₃— | H | 75 | 63.8 | 73.9 | 99.5 |
| 2 | (CH₃)₂CH— | H | 2—CH₃— | H | 500 | 42.8 | 61.0 | 95.2 |
| 2 | (CH₃)₂CH—C₂H₅ (sec-butyl) | H | 2—CH₃— | H | 150 | 52.1 | 70.5 | 85.3 |
| 2 | CH₂=CH—CH₂— | H | 2—CH₃— | H | 75 | 60.1 | 71.3 | 94.2 |
| 2 | (CH₃)₂CH— | Na | 2—CH₃— | 6—CH₃— | 500 | 60.9 | 61.0 | 82.2 |
| 2 | (CH₃)₂CH— | Na | 3—CH₃— | H | 75 | 58.5 | 72.2 | 101.3 |

As seen from Table 2, there was obtained considerably lower noradrenaline values by means of the compounds proposed according to the invention in relation to the normal contents of noradrenaline.

The intraperitoneal toxicity of the compounds of the present invention was determined on albino mice as follows:

Each tested compound was injected intraperitoneously into a group of ten mice and the animals were observed over a week's period. The number of mice which were killed at each dose was registered and expressed in percent of the number of animals being injected with that particular dose. The dose that killed 50% of the animals (LD₅₀) was calculated from a logarithmic dose response graph.

The intraperitoneal toxicity of the compounds according to the present invention where n, R¹, R², R³, and R⁴ have the indicated meaning is reported in Table 3.

We claim:

1. A method for the inhibition of the enzyme dopamine-β-hydroxylase, which comprises administering to a mammal a therapeutically effective dose containing, as the active compound, a compound of the formula

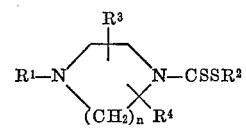

wherein $n$ is 2, R¹ is a straight or branched alkenyl or alkyl group having at most six carbon atoms, R³ and R⁴ are hydrogen or methyl, and R² is hydrogen, sodium, or another non-toxic cation.

2. A method according to claim 1, wherein R¹ is selected from the group consisting of methyl, ethyl, n-propyl, isopropyl, sec-butyl, amyl and allyl.

3. A method according to claim 1, wherein $R^1$ is selected from the group consisting of methyl, ethyl, n-propyl, isopropyl, butyl and allyl, $R^3$ and $R^4$ are hydrogen, and $R^2$ is hydrogen or sodium.

4. A method according to claim 1, wherein $R^1$ is selected from the group consisting of methyl, ethyl, isopropyl, sec-butyl, amyl and allyl, $R^2$ is selected from the group consisting of hydrogen and sodium, $R^3$ is selected from the group consisting of methyl in the two- and three-positions and $R^4$ is hydrogen.

5. A method according to claim 1, wherein $R^1$ is selected from the group consisting of methyl and isopropyl, $R^2$ is selected from the group consisting of hydrogen and sodium, $R^3$ is selected from the group consisting of methyl in the two- and three-positions and $R^4$ is selected from the group consisting of methyl in the five- and six-positions.

6. The method according to claim 1, wherein the therapeutically effective dose is administered parenterally by injecting an aqueous solution having a concentration of 0.5% to 10% active component by weight.

7. A method according to claim 1, wherein the therapeutically effective dose is administered perorally, said dose having from about 0.5 ml. to about 7 ml. active component per kilogram of body weight.

8. A pharmaceutical preparation for inhibiting the enzyme dopamine-β-hydroxylase in a mammal which comprises a therapeutically effective dose containing, as the active component, a compound of the formula

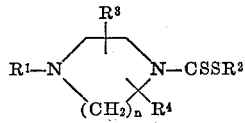

wherein $n$ is 2, $R^1$ is a straight or branched alkenyl or alkyl group having at most six carbon atoms, $R^3$ and $R^4$ are hydrogen or methyl, and $R^2$ is hydrogen, sodium, or another non-toxic cation in association with a pharmaceutical carrier.

9. A pharmaceutical preparation according to claim 8, wherein $R^1$ is selected from the group consisting of methyl, ethyl, n-propyl, isopropyl, butyl and allyl, $R^3$ and $R^4$ are hydrogen, and $R^2$ is hydrogen or sodium.

10. A pharmaceutical preparation according to claim 8, wherein $R^1$ is selected from the group consisting of methyl, ethyl, n-propyl, isopropyl, sec-butyl, amyl and allyl.

11. A pharmaceutical preparation according to claim 8, wherein $R^1$ is selected from the group consisting of methyl, ethyl, isopropyl, sec-butyl, amyl and allyl, $R^2$ is selected from the group consisting of hydrogen and sodium, $R^3$ is selected from the group consisting of methyl in the two- and three-positions and $R^4$ is hydrogen.

12. A pharmaceutical preparation according to claim 8, wherein $R^1$ is selected from the group consisting of methyl and isopropyl, $R^2$ is selected from the group consisting of hydrogen and sodium, $R^3$ is selected from the group consisting of methyl in the two- and three-positions and $R^4$ is selected from the group consisting of methyl in the five- and six-positions.

13. A pharmaceutical preparation according to claim 8, suitable for administration by injection which contains between 0.1% and 95% active component by weight.

14. A pharmaceutical preparation according to claim 8, suitable for oral administration which contains between 2% and 50% active component by weight.

References Cited

UNITED STATES PATENTS 3,558,266  1/1971  Kleemann et al. __ 260—268 C X

ALBERT T. MEYERS, Primary Examiner

L. SCHENKMAN, Assistant Examiner

U.S. Cl. X.R.

424—244